Figure 1:
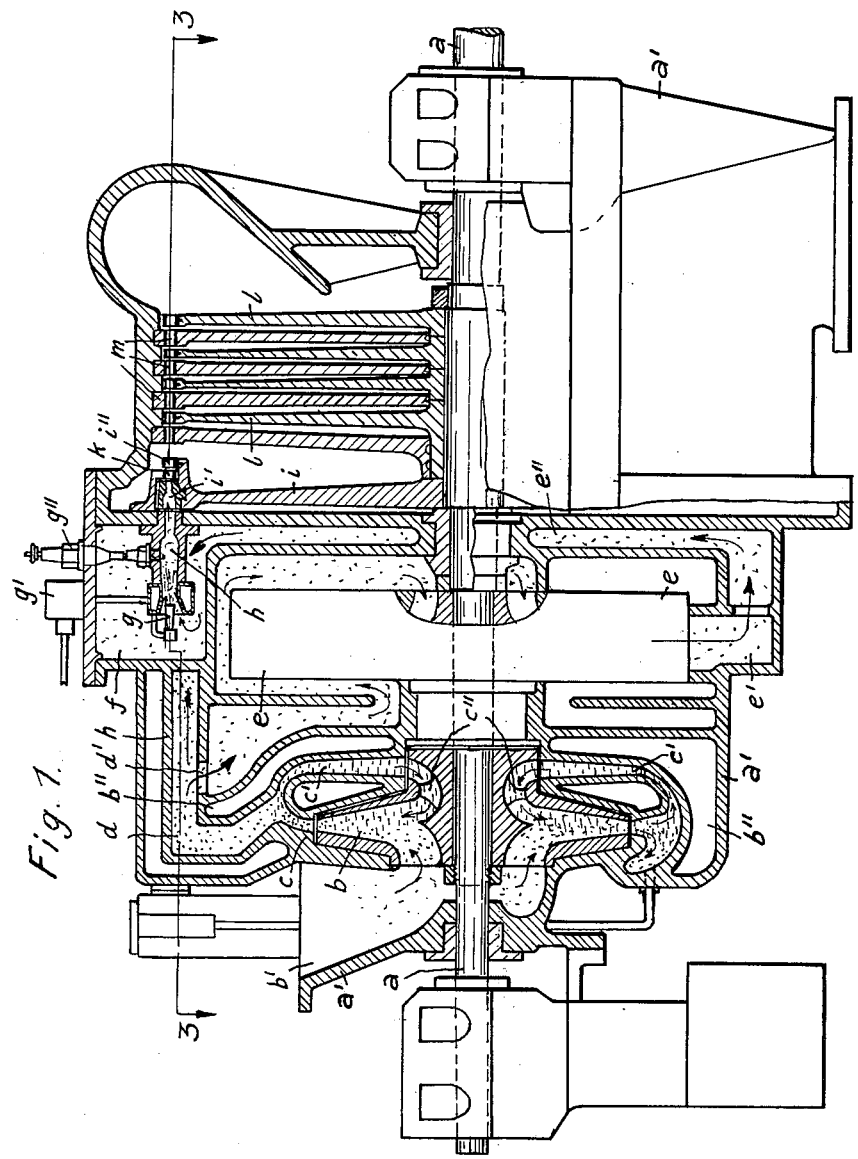

March 28, 1961 E. R. WIRTH 2,976,684
IMPROVEMENTS IN GAS TURBINES
Filed Dec. 26, 1951 3 Sheets-Sheet 1

Inventor:
E. R. Wirth

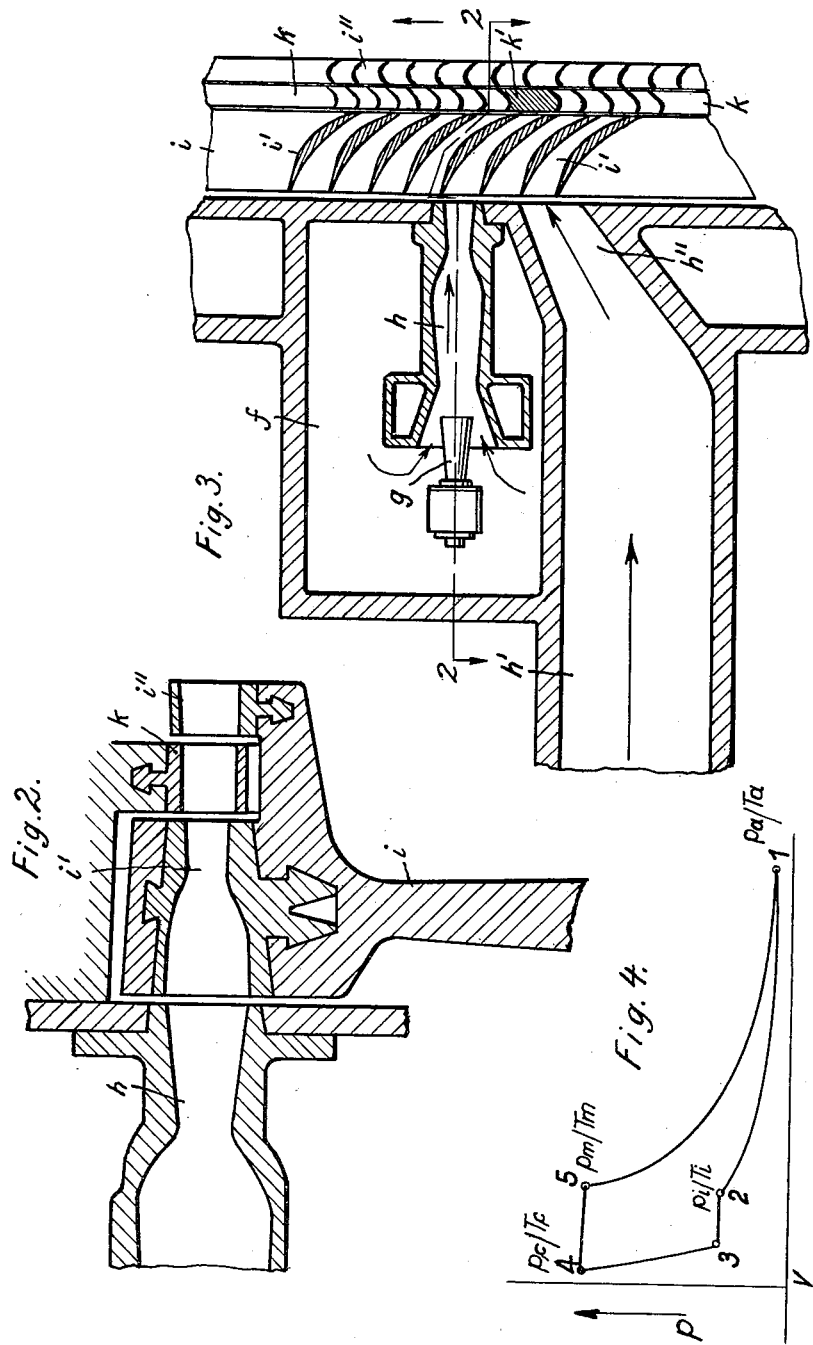

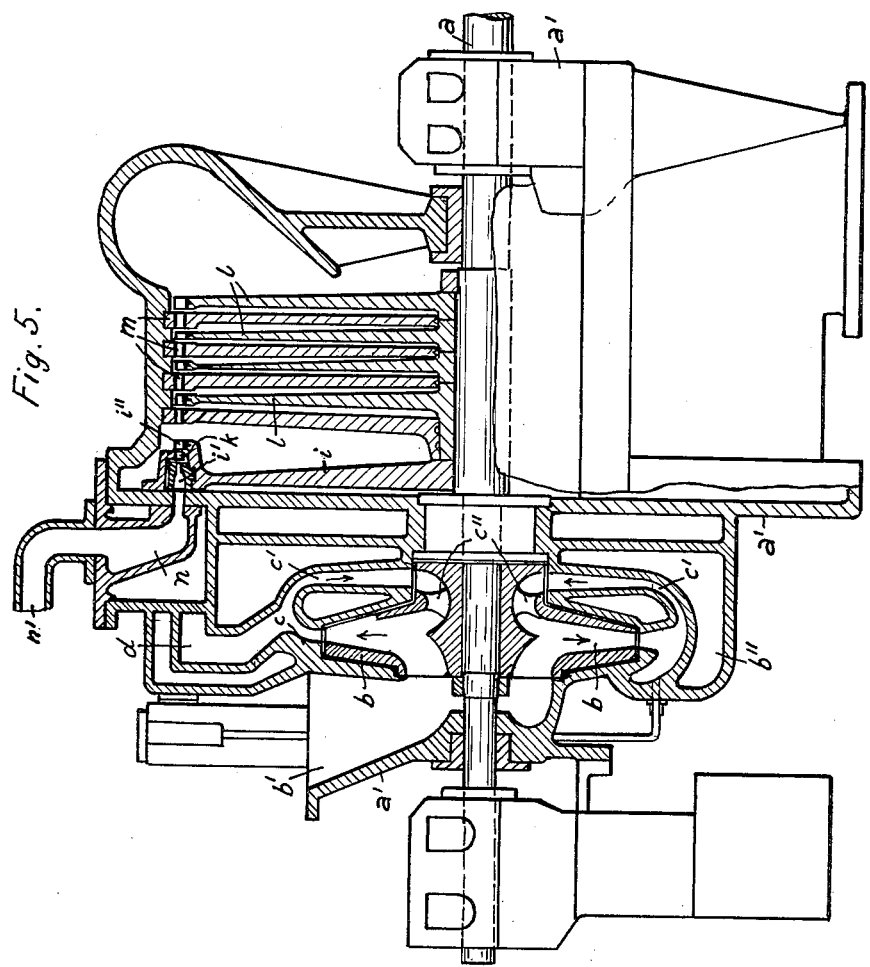

United States Patent Office 2,976,684
Patented Mar. 28, 1961

2,976,684

IMPROVEMENTS IN GAS TURBINES

Emil Richard Wirth, 1574 Melba Court,
Mountain View, Calif.

Filed Dec. 26, 1951, Ser. No. 263,262

Claims priority, application Germany May 10, 1951

5 Claims. (Cl. 60—39.75)

For heat engines which in contradistinction to piston engines function in the manner of a turbine various suggestions present themselves. In one case the fuel is utilized through explosions taking place in rhythmic succession, in the other case through continuous combustion for producing the requisite heat. The driving wheel has disposed before it or after it a compressor which produces the compressed air necessary for the combustion, as on the one hand the produced heat is to be utilized as efficiently as possible, while on the other hand the produced temperatures become too high for the available materials. As it is also necessary for the cooling of the machine to be kept at the lowest possible limit, such machines are of little practical use, more particularly for the reason, that the efficiency they can reach is relatively low.

The present invention relates to the conversion of heat energy into work and comprises a machine, by which the heat energy which is produced in the combustion of fuel or is inherent in hot gases is utilized to a higher degree than hitherto. According to the invention a gaseous medium, such as gas or air, is subjected to isothermic compression and is then with constant volume admixed to the hot products of combustion in such proportion that all the heat is utilized for raising the temperature and the pressure of the relatively cool air or gas up to a predetermined extent, which latter is determined by the conditions, that is to say, by the composition of the mixture and the pressure conditions before the mixture. The mixing pressure and the temperature of the gas mixture are characterized in this, that:

(1) The mixing temperature drops during the subsequent expansion to the atmospheric pressure and to the atmospheric temperature, (2) The mixing temperature is so low that the mixed gases may be used as driving agent in the turbine blades, without the necessity of cooling the surfaces, with which the gases come in contact. In the machine, in which this working process is realized, all energy transmitting parts are rotating parts.

The isothermic compression is effected by a circulating liquid (for instance oil, water or the like, having a high boiling point) which is kept in circulation in a combnation of a centrifugal pump wheel wth a liquid turbine rotor wheel. The gas mixture is produced in retention and mixing chambers which are formed by turbine blades distributed uniformly at the periphery of a turbine rotor wheel. The chambers have at the inlet side a relatively large cross-sectional area which tapers to a nozzle-shaped duct at the outflow side. After the mixing and effected expansion the energy of the mixed gases is converted as kinetic energy into work in the same way as in steam turbines.

The invention is illustrated in the accompanying drawings by way of example, in which:

Fig. 1 shows a constructional example of the machine for carrying out the invention in vertical longitudinal section, Fig. 2 is a part longitudinal section on the line 2—2 of Fig. 3 on a larger scale and Fig. 3 a part horizontal longitudinal section on the line 3—3 of Fig. 1 also to a larger scale, Fig. 4 shows the working process in a diagram, Fig. 5 is a longitudinal section through a second constructional example of the invention.

The hot gas turbine operates with a compressor which in this case, in a similar manner to a centrifugal pump, is provided with a rotor wheel $b$ on the turbine shaft $a$ and surrounded in a known manner by a guide apparatus $c$ in the compressor casing $a'$, as shown in Fig. 1, the said guide apparatus $c$ comprising a loop conduit terminating in radial ducts $c'$. The pump contains a liquid such as oil or the like, of high boiling point and during the operation of the rotor the said liquid travels through the rotor wheel $b$ under the action of centrifugal force into the said loop conduit and passes into the ducts $c'$ and through an intake at the nave of the rotor wheel $b$ provided with guide blades $c''$ from which it again travels through the rotor wheel $b$. Air is drawn into the compressor casing through an air inlet $b'$ and passes through the rotor wheel $b$ where it is compressed isothermally, the compressed air being kept at a constant temperature by a cooling jacket $b''$ surrounding the compressor. The compressed air passes through an outlet in the said loop conduit into a duct $d$, while the liquid returns to the rotor wheel through the loop conduit. In the duct $d$ the air stream divides. One part of the stream is conveyed directly through the casing $h'$ in Fig. 3 to the nozzle $h''$ and forced into the chambers $i'$ of the driving wheel $i$. Another part of the stream branches off at $d'$ to a centrifugal re-compressor $e$ which brings the air up to a higher pressure and conveys it through its casing $e'$ and the chamber $e''$ into a chamber $f$. In this chamber is the burner $g$ which is fed by way of the supply pipe $g'$. The burner $g$ discharges in a nozzle-shaped chamber $h$ which for instance contains a sparking plug $g''$. The fuel is once ignited, so that the burner $g$ is continuously in operation. It is fed with the super-compressed air out of the re-compressor $e$. Behind the chamber $f$ the driving wheel $i$ is mounted on the shaft $a$. It forms a blade wheel with chambers $i'$ which taper in the manner of a nozzle towards the outlet, as may be seen more particularly in Fig. 2. A ring with guide blades $k$ guides the escaping gases coming out of the chambers $i'$ to a second blade ring $i''$ of the driving wheel $i$. This is followed by a turbine unit with the rotor wheels $l$ and the guide rings $m$, for enabling the energy of the escaping gases to be still further used up, if possible down to atmospheric pressure. The outlet of the combustion chamber $h$ is arranged forwardly of the nozzle outlet $h''$ of the duct $h'$ in the direction of rotation of the wheel $i$ so as to register with and deliver hot gases to the mixing chambers $i'$ subsequently to the delivery of compressed air thereto through the nozzle outlet $h''$.

The chambers $i'$ formed by the spaces between the blades of the driving wheel $i$ constitute mixing chambers. The isothermally compressed air flows out of the duct $h'$ through the nozzle outlet $h''$ into the said chambers with a relatively low velocity in the axial direction owing to the comparatively small pressure difference between the duct $h'$ and the spaces between the guide blades $k$, and thus does not have sufficient time to reach the constricted outlets of the chambers $i'$ during the short path of travel of the blades of the driving wheel $i$ between the outlet $h''$ of the duct $h'$ and the outlet of the combustion chamber $h$. The chambers $i'$ are therefore not completely filled with the isothermally compressed air. As soon as the incompletely filled chambers $i'$ register with the outlet opening of the combustion chamber $h$, the hot gases therein enter the chambers $i'$ from the combustion chamber at a high velocity, owing to the considerable pressure difference present there and mix with and heat the air in the chambers $i'$.

The air and combustion gases admitted to the chambers $i'$ cannot immediately escape therefrom, firstly owing to the constricting action of the chambers the cross-section of which narrows towards their outlet ends, and secondly on account of the provision in the guide blade ring $k$ of baffle means comprising a wall segment $k'$ extending between the nozzle outlet $h''$ and the outlet of the combustion chamber $h$ on the outlet side of the chambers $i'$. The air in the chambers $i'$ will thus be mixed with the combustion gases, the mixing taking place at constant volume in accordance with the mixture ratio, so that the pressure in the chambers $i'$ will be raised at constant volume, that is to say in proportion to the absolute temperature.

The working diagram of such a heat engine is shown in Fig. 4. In this figure: the line 1—2 represents isothermic compression, line 2—3 represents the division of the air stream, line 3—4 super-compression of the combustion air, line 4—5 combustion of the mixture, line 5—1 adiabatic expansion. The combustion pressure $pc$ is equal to or greater than the produced mixing pressure $pm$.

When mixing with constant volume, the increase in pressure is directly proportional to the increase in the absolute temperatures.

$$\frac{\text{abs. mix. temp. } Tm}{\text{abs. isotherm. temp. } Ta} = \frac{\text{mix. press. } pm}{\text{isotherm. press. } pi}$$

hence $$pm = pi.Tm/Ta$$

with adiabatic expansion $$pm = (Tm/Ta)\frac{x}{x-1}$$

$$x = cp/cv$$

where $cp$ = spec. heat at const. pressure
$cv$ = spec. heat at const. volume

If $Gg$ be the weight of the combustion gases and $Gi$ the weight of the gas medium flowing into the retention and the mixing chambers $i'$, then the heat in the combustion gases $Qg = Gg.cg(tg - ta)$, wherein $cg$ = spec. heat of the combustion gases and $tg$ the temperature of the combustion gases.

If the heat energy given off during the flow into the retention and mixing chambers $i'$ in the form of work, that is to the blades, be disregarded, the quantity of heat given off to the isothermically compressed has medium $$Qm = Gg.cg(tg - tm)$$

as for raising the temperature of the isothermically compressed gas medium at constant volume the quantity of heat $$Qm = Gi.ci(tm - ta)$$

is required, we obtain the mixing ratio $$\frac{Gi}{Gg} = \frac{ca.(ta - tm)}{ci(tm - ta)}$$

$ci$ = spec. heat of the isotherm. compressed gas medium.

As the whole of the introduced heat $Qg$ was used for raising the internal energy of the gas medium in the retention and mixing chambers $i'$, the efficiency amounts to $$\frac{Qg - Qi}{Qg}$$

$Qi$ = amount of heat, which has to be conveyed away in the isothermic compression. The efficiency corresponds to that of the Carnot process, but in contradistinction to the latter, there are required with it with the same heat drop only low pressures which can be produced with relatively simple mechanisms.

From the above equations it will be seen, that the higher the mixing temperature, the smaller need be the weight of the gas medium to be isothermically compressed. As the retention and mixing chambers $i'$ are exposed for only a short time with interruptions to the mixing temperatures and the partially expanded mixing gases which leave the chambers have a low temperature corresponding to the pressure drop and the turbine space or any further rotor and guide wheels are exposed to only this latter temperature, relatively high temperatures may be employed.

Such a heat engine in turbine form could work, for instance, with pressure ranges similar to those of an ordinary internal combustion engine with mixing temperatures of about $tm = 450°$ C. corresponding to a mixing pressure of $pm = 25$ kg./qcm. and an isothermic pressure $pi = 10$ kg./qcm. The temperature of the gases entering the turbine space amounts to about 290° C.

By isothermic compression, adiabatic expansion and mixing at constant volume such transitions are to be understood, as can be approximately carried out in practice as near as possible to the ideal process.

In the constructional example in Fig. 5 the compressor $b$ is retained. In place of the recompression, hot waste gas from any available source is conveyed at $n'$ into the chamber $n$, which may be followed by a nozzle $h$, for instance, such as that shown in Figs. 2 and 3, from which the gas enters the chambers $i'$ of the driving wheel $i$.

What I claim is:

1. A gas turbine, comprising in combination, a rotor shaft with a plurality of bladed rotor wheels thereon, a driving wheel on said shaft arranged upstream of said rotor wheels and having blades thereon forming mixing chambers tapering in the manner of nozzles in the direction towards the said rotor wheels, an air compressor in driving relationship with the rotor shaft, a conduit connected to said air compressor and having a nozzle outlet arranged to deliver compressed air to said mixing chambers, a hot gas chamber having an outlet arranged forwardly of said nozzle outlet in the direction of rotation of the driving wheel so as to register with and deliver hot gases to said mixing chambers subsequently to the delivery of compressed air thereto through said nozzle outlet, and stationary baffle means interposed between said driving wheel and rotor wheels and extending between said nozzle outlet and outlet of the hot gas chamber and adapted to obstruct the outflow of compressed air from the mixing chambers until the hot gases have been admitted thereto and mixed with the compressed air therein.

2. A gas turbine, comprising in combination, a rotor shaft with a plurality of bladed rotor wheels thereon, a driving wheel on said shaft arranged upstream of said rotor wheels and having blades thereon forming mixing chambers tapering in the manner of nozzles in the direction towards the said rotor wheels, an air compressor in driving relationship with the rotor shaft, a conduit connected to said air compressor and having a nozzle outlet arranged to deliver compressed air to said mixing chambers, a hot gas chamber having an outlet arranged forwardly of said nozzle outlet in the direction of rotation of the driving wheel so as to register with and deliver hot gases to said mixing chambers subsequently to the delivery of compressed air thereto through said nozzle outlet, a ring of stationary guide blades interposed between said driving wheel and rotor wheels with a wall segment therein extending between the said nozzle outlet and the outlet of the combustion chamber for obstructing the outflow of compressed air from the mixing chambers until the hot gases have been admitted thereto and mixed with the compressed air therein.

3. A gas turbine, comprising in combination, a rotor shaft with a plurality of bladed rotor wheels thereon, a driving wheel on said shaft arranged upstream of said rotor wheels and having blades thereon forming mixing chambers tapering in the manner of nozzles in the direction towards the said rotor wheels, an air compressor in driving relationship with the rotor shaft, a conduit connected to said air compressor and having a nozzle outlet arranged forwardly of said nozzle outlet in the direction of rotation of the driving wheel so as to register with and deliver compressed air to said mixing chambers, a combustion chamber having a fuel inlet and an outlet arranged to deliver combustion gases to said mixing chambers subsequently to the delivery of compressed air thereto through said nozzle outlet, a conduit connected to the air compressor and to said combustion chamber for supplying compressed air to the combustion chamber, fuel igniting means in the combustion chamber, and a ring of stationary guide blades interposed between said driving wheel and rotor wheels with a wall segment therein extending between said nozzle outlet and outlet of the combustion chamber and adapted to obstruct the outflow of compressed air from the mixing chambers until the hot gases have been admitted thereto and mixed with the compressed air therein.

4. A gas turbine, comprising in combination, a rotor shaft with a plurality of bladed rotor wheels thereon, a driving wheel on said shaft arranged upstream of said rotor wheels and having blades thereon forming mixing chambers tapering in the manner of nozzles in the direction towards the said rotor wheels, a low-pressure air compressor and a high-pressure air compressor in driving relationship with the rotor shaft, a conduit connected to said compressors for passing a portion of the compressed air from the low-pressure compressor to the high-pressure compressor for compression to a higher pressure, a conduit connected to the low-pressure compressor and having a nozzle outlet arranged to deliver compressed air to said mixing chambers, a combustion chamber having a fuel inlet and an outlet arranged forwardly of said nozzle outlet in the direction of rotation of the driving wheel so as to register with said mixing chambers subsequently to the delivery of compressed air thereto through said nozzle outlet, a conduit connected to said high-pressure compressor and to the combustion chamber for supplying high-pressure compressed air to the combustion chamber, fuel igniting means in the combustion chamber, and stationary baffle means interposed between said driving wheel and rotor wheels and extending between said nozzle outlet and outlet of the combustion chamber and adapted to obstruct the outflow of compressed air from the mixing chambers until the hot gases have been admitted thereto from the combustion chamber and mixed with the compressed air therein.

5. A gas turbine, comprising in combination, a rotor shaft with a plurality of bladed rotor wheels thereon, a driving wheel on said shaft arranged upstream of said rotor wheels and having blades thereon forming mixing chambers tapering in the manner of nozzles in the direction towards the said rotor wheels, a low-pressure air compressor and a high-pressure air compressor in driving relationship with the rotor shaft, a conduit connected to said compressors for passing a portion of the compressed air from the low-pressure compressor to the high-pressure compressor for compression to a higher pressure, a conduit connected to the low-pressure compressor and having a nozzle outlet arranged to deliver compressed air to said mixing chambers, a combustion chamber having a fuel inlet and an outlet arranged forwardly of said nozzle outlet in the direction of rotation of the driving wheel so as to register with said mixing chambers subsequently to the delivery of compressed air thereto through said nozzle outlet, a conduit connected to said high-pressure compressor and to the combustion chamber for supplying high-pressure compressed air to the combustion chamber, fuel igniting means in the combustion chamber, a ring of stationary guide blades interposed between said driving wheel and rotor wheels with a wall segment therein extending between the said nozzle outlet and the outlet of the combustion chamber for obstructing the outflow of compressed air from the mixing chambers until hot gases have been admitted thereto from the combustion chamber and mixed with the compressed air delivered to the mixing chambers through the said nozzle outlet.

References Cited in the file of this patent

UNITED STATES PATENTS

| | | |
|---|---|---|
| 1,375,931 | Rateau | Apr. 26, 1921 |
| 2,536,062 | Kane | Jan. 2, 1951 |
| 2,563,269 | Price | Aug. 7, 1951 |
| 2,626,502 | Lagelbauer | Jan. 27, 1953 |

FOREIGN PATENTS

| | | |
|---|---|---|
| 100,202 | Austria | June 25, 1925 |
| 502,414 | Great Britain | Mar. 13, 1939 |